(12) United States Patent
Lu et al.

(10) Patent No.: US 11,994,660 B2
(45) Date of Patent: May 28, 2024

(54) LIGHT-EMITTING MODULE

(71) Applicant: HERGY INTERNATIONAL CORP., Taipei (TW)

(72) Inventors: Chun-Hung Lu, Taipei (TW); Hong-Jyun Wang, Taipei (TW)

(73) Assignee: HERGY INTERNATIONAL CORP., Taipei (TW)

( * ) Notice: Subject to any disclaimer, the term of this patent is extended or adjusted under 35 U.S.C. 154(b) by 189 days.

(21) Appl. No.: 17/881,565

(22) Filed: Aug. 4, 2022

(65) Prior Publication Data
US 2024/0045187 A1 Feb. 8, 2024

(51) Int. Cl.
*G02B 19/00* (2006.01)
*G02B 3/06* (2006.01)

(52) U.S. Cl.
CPC .......... *G02B 19/0009* (2013.01); *G02B 3/06* (2013.01); *G02B 19/0066* (2013.01)

(58) Field of Classification Search
None
See application file for complete search history.

(56) References Cited

FOREIGN PATENT DOCUMENTS

| CN | 1447141 A | 10/2003 |
|---|---|---|
| CN | 101595412 A | 12/2009 |
| DE | 102009016608 A1 | 11/2009 |
| TW | 201809837 A | 3/2018 |
| TW | 201839434 A | 11/2018 |

OTHER PUBLICATIONS

Office Action dated Dec. 13, 2022 of the corresponding Taiwan patent application No. 111124836.

*Primary Examiner* — Robert E. Tallman
(74) *Attorney, Agent, or Firm* — Chun-Ming Shih; HDLS IPR SERVICES

(57) ABSTRACT

A light-emitting module (1) includes a light-emitting unit (10) and a rod lens (20). The light-emitting unit (10) outputs a light (11). The rod lens (20) is adjacent to the light-emitting unit (10), and converges the light (11) along an optical axis (100). A radial direction of the rod lens (20) is parallel to the optical axis (100). A distance between an axis (21) of the rod lens (20) and a light-emitting center (12) of the light-emitting unit (10) along the radial direction is greater than or equal to a focal length of the rod lens (20) along the radial direction.

8 Claims, 6 Drawing Sheets

LIGHT-EMITTING MODULE

BACKGROUND

Technical Field

The present disclosure relates to a light-emitting module, in particular to a light-emitting module with better optical utilization and service life.

Description of Related Art

Some light sources (for example, UVA LEDs) applied to a curing process in related arts are mostly Lambertian light sources. A light shape outputted by the Lambertian light source generally refers to a radiation angle in which a full width at half maximum (FWHM) of an output spectrum may reach 120 degrees.

When the Lambertian light source is used together with a lens, part of light with a large radiation angle in the Lambertian light source will not be able to smoothly enter the lens, resulting in part energy of the light is wasted. In related art, it may be considered to increase a size of the lens and make the lens as close as possible to the Lambertian light source, for example by placing the Lambertian light source within a focal length of the lens, so that all lights within a range of 120 degrees are able to enter the lens. However, the two conditions of increasing the size of the lens and placing the Lambertian light source within the focal length of the lens both increase a penetration distance of the light in the lens, which may reduce a transmittance of the light in the lens, and make the light hard to be concentrated. As a result, not only an illuminance applied to a surface for curing is reduced, an efficiency of the curing process is reduced, but also a volume and cost of a curing system are increased.

Therefore, how to design a light-emitting module is an important subject studied by the inventor of the present disclosure.

SUMMARY

One object of the present disclosure is to provide a light-emitting module, compared with related art, the present disclosure does not need to increase a size of a lens to concentrate all lights outputted from a light source. The object of improving an efficiency of a curing process and reducing a volume and cost of a curing system is achieved.

In order to achieve the object of the present disclosure, the light-emitting module includes a light-emitting unit and a rod lens. The light-emitting unit outputs a light. The rod lens is adjacent to the light-emitting unit, and converges the light along an optical axis. A radial direction of the rod lens is parallel to the optical axis. A distance between an axis of the rod lens and a light-emitting center of the light-emitting unit along the radial direction is greater than or equal to a focal length of the rod lens along the radial direction.

In some embodiments, a light-emitting angle of the light-emitting unit outputting the light is less than or equal to 2θ.

In some embodiments, the focal length of the rod lens along the radial direction is "f", and a diameter of the rod lens along the radial direction is "W", and a relationship is satisfied as follows:

$$\theta = \tan^{-1}\left(\left(\frac{W}{2}\right)/f\right)$$

In some embodiments, the number of the light-emitting units is plural, and the light-emitting units are arranged in parallel along the axial direction of the rod lens as a linear array light source.

In some embodiments, the light-emitting module further includes a lens holder, the lens holder holds the rod lens along the radial direction of the rod lens perpendicular to the optical axis. The distance between the axis of the rod lens and the light-emitting center of the light-emitting unit along the radial direction is equal to the focal length of the rod lens along the radial direction.

In some embodiments, the lens holder includes two bracket units, the two bracket units are arranged opposite to each other along the radial direction of the rod lens, and are symmetrically bent at a non-zero angle along the optical axis.

In some embodiments, the lens holder includes a protection mechanism, the protection mechanism is arranged on at least one side surface of the rod lens along the axial direction, and protrudes out of the side surface along the optical axis.

In some embodiments, a portion of the protection mechanism protruding beyond the side surface is a plane.

In some embodiments, the light-emitting module further includes a protection mechanism, the protection mechanism is arranged on at least one side surface of the rod lens along the axial direction, and protrudes out of the side surface along the optical axis.

In some embodiments, a portion of the protection mechanism protruding beyond the side surface is a plane.

In summary, the light-emitting module of the present disclosure is arranged in a manner that the radial direction of the rod lens is parallel to the optical axis. That is, the axis of the rod lens and the light-emitting center of the light-emitting unit are located on the same spatial plane, so that the light outputted by the light-emitting unit may be symmetrically refracted along the radial direction of the rod lens to have an ideal optical effect.

It is worth mentioning that, in some embodiments, the light-emitting angle of the light-emitting unit outputting the light is less than or equal to 2θ, the focal length of the rod lens along the radial direction is "f", and the diameter of the rod lens along the radial direction is "W", and the relationship is satisfied as follows:

$$\theta = \tan^{-1}\left(\left(\frac{W}{2}\right)/f\right)$$

According to the principle of optics, when an object is within a focal length of a convex lens, the light will form an upright virtual image on the same side of the object, and the light may not be converged on the other side of the convex lens. Compared with the related art, the light-emitting module of the present disclosure employs a design of the aforementioned relationship and does not need to increase the size of the rod lens. The distance between an axis of the rod lens and a light-emitting center of the light-emitting unit along the radial direction is greater than or equal to a focal length of the rod lens along the radial direction, and the light is able to be concentrated on the other side of the rod lens, thereby, reducing a transmittance of the light in the rod lens is avoided.

Therefore, compared with the related art, the light-emitting module of the present disclosure does not need to increase the size of the rod lens to concentrate all lights outputted from the light-emitting unit. The object of improving the efficiency of the curing process and reducing the volume and cost of the curing system is achieved.

In order to further understand the techniques, means, and effects of the present disclosure for achieving the intended object. Please refer to the following detailed description and drawings of the present disclosure. The drawings are provided for reference and description only, and are not intended to limit the present disclosure.

DETAILED DESCRIPTION

Figure 1:
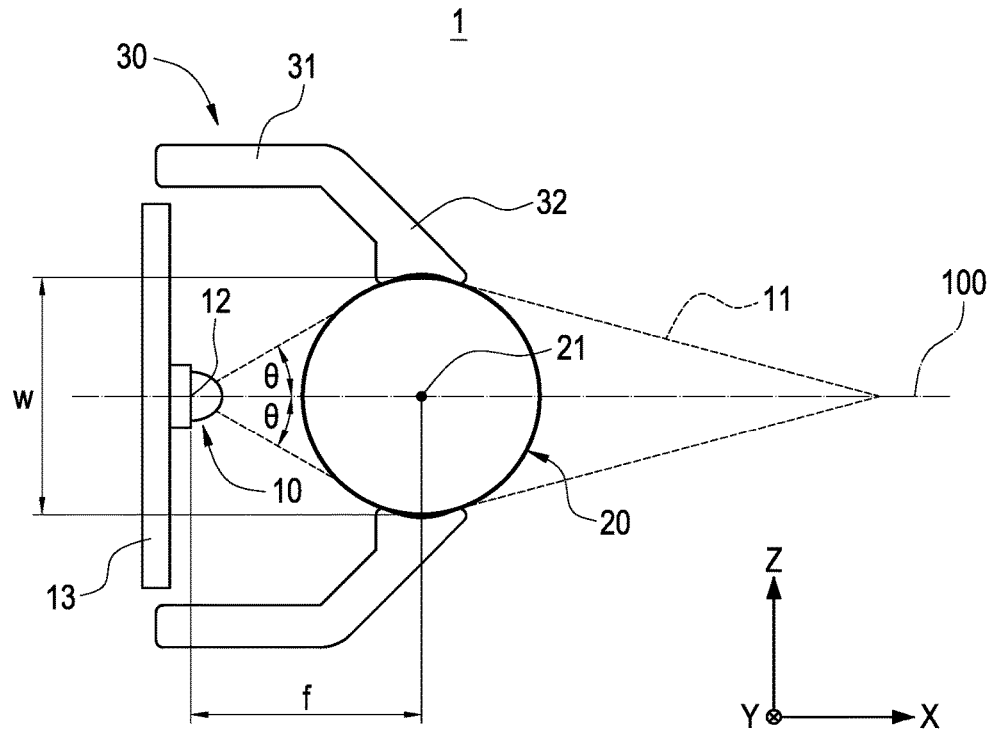
FIG. 1 is a schematic side view of a first embodiment of the light-emitting module of the present disclosure.

The following are specific examples to illustrate some implementations of the present disclosure. A person skilled in the art may understand the advantages and effects of the present disclosure from the content disclosed in this specification. The present disclosure may be implemented or applied through other different specific embodiments, and various details in this specification may also be based on different viewpoints and applications, and various modifications and changes may be made without departing from the concept of the present disclosure.

It should be understood that the structures, the proportions, the sizes, the number of components, and the like in the drawings are only used to cope with the contents disclosed in the specification for understanding and reading by those skilled in the art, and it is not intended to limit the conditions that may be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

The technical content and detailed description of the present disclosure will be described below in conjunction with the drawings.

Figure 2:
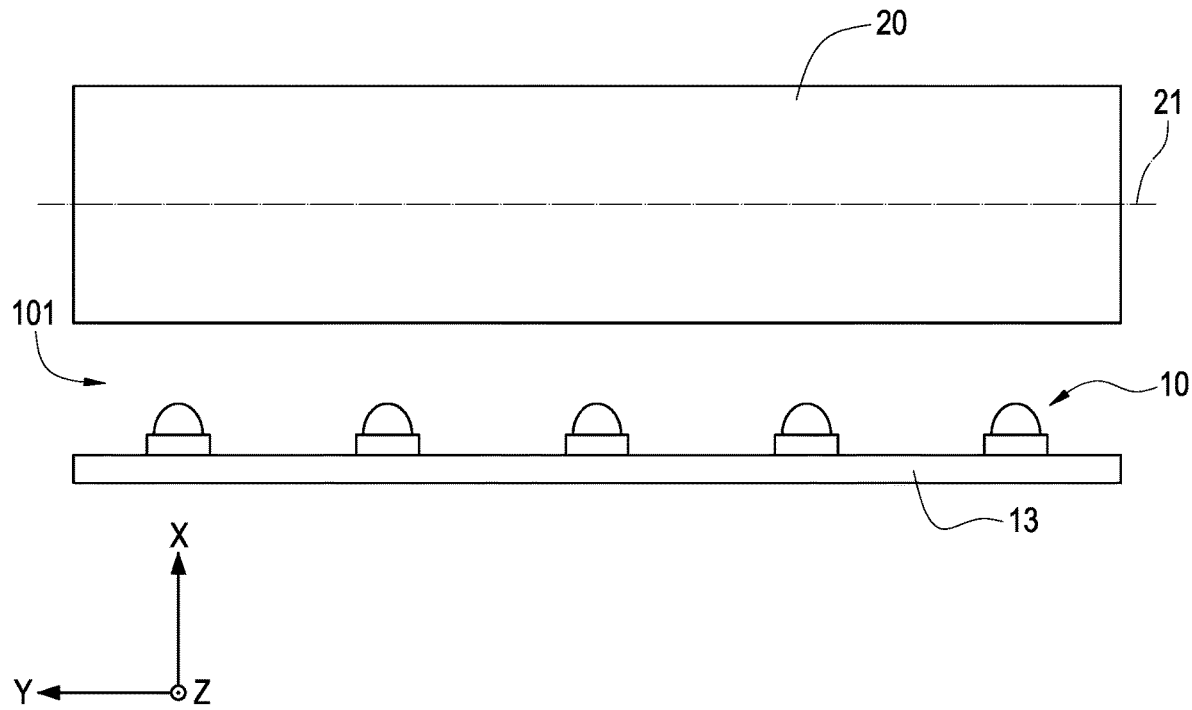
FIG. 2 is a schematic top view of the first embodiment of the light-emitting module of the present disclosure.

FIG. 1 is a schematic side view of a first embodiment of the light-emitting module of the present disclosure. FIG. 2 is a schematic top view of the first embodiment of the light-emitting module of the present disclosure.

As shown in FIG. 1, the light-emitting module 1 includes a light-emitting unit 10 and a rod lens 20.

The light-emitting unit 10 outputs a light 11.

In some embodiments, the light-emitting unit 10 may include light-emitting diode (LED), and the light-emitting diode may include red light-emitting diode in a visible light range (for example, aluminum gallium arsenide (AlGaAs), arsenide Gallium phosphide (GaAsP), indium gallium aluminum phosphide (AlGaInP), gallium phosphide doped zinc oxide (GaP:ZnO)), orange light-emitting diode (for example, gallium arsenide phosphide (GaAsP), phosphide Indium gallium aluminum phosphide (AlGaInP), gallium phosphide doped X (GaP:X)), yellow light-emitting diode (for example, gallium arsenide phosphide (GaAsP), indium gallium aluminum phosphide (AlGaInP), gallium phosphide doped nitrogen (GaP:N)), green light-emitting diode (for example, indium gallium nitride (InGaN), gallium nitride (GaN), gallium phosphide (GaP), aluminum indium gallium phosphide (AlGaInP), aluminum gallium phosphide (IGaP), blue light-emitting diode (for example, zinc selenide (ZnSe), indium gallium nitride (InGaN), silicon carbide (SiC)), violet light-emitting diode (for example, indium nitride) gallium (InGaN)), and infrared light-emitting diode (for example, gallium arsenide (GaAs), aluminum gallium arsenide (AlGaAs)) or ultraviolet light-emitting diode (for example, diamond, aluminum nitride (AlN), aluminum gallium nitride (AlGaN), aluminum gallium indium nitride (AlGaInN), etc., and the light-emitting diode may also include organic light-emitting diode (OLED), but there is not limited thereto.

In some embodiments, a light-emitting angle of the light-emitting unit 10 outputting the light 11 is less than or equal to 2θ. The "2θ" mentioned here refers to an angle about a light-emitting center 12 of the light-emitting unit 11 for radiating the light 11 to face a diameter W of the rod lens 20 along the radial direction. As shown in FIG. 1, the rod lens 20 is, for example but not limited to, a cylinder. That is, the rod lens 20 facing the light-emitting unit 10 may cover an entire light-emitting angle of the light-emitting unit 10, so that all the lights 11 may enter the rod lens 20 and be applied to an entire light path, so as to avoid wasting part energy of the lights 11, and to improve an efficiency of a curing process, but there is no limited thereto. Further, a semiconductor die for radiating ultraviolet (UV) or near-infrared (NIR) light is close to a Lambertian source. A light shape outputted by the Lambertian light source generally refers to a radiation angle in which a full width at half maximum (FWHM) of an output spectrum may reach 120 degrees. In related art, a surface of the semiconductor die is covered with packaging materials, such as epoxy, silicone, quartz, etc., the packaging materials are used to protect the semiconductor die, change the light shape and light angle outputted, and improve an extraction rate of the light 11, there is no limited thereto.

In some embodiments, the light-emitting center 12 of the light-emitting unit 10 and the axis 21 of the rod lens 20 are located on a same plane (for example, an optical axis 100), so that the optical axis 100 just bisects the light-emitting angle "2θ" of the light-emitting unit 10 to the angle θ, there is no limited thereto.

As shown in FIG. 1, in some embodiments, further, the focal length of the rod lens 20 along the radial direction is "f", and the diameter of the rod lens 20 along the radial direction is "W". When the light-emitting center 12 is located at a focal point of the rod lens 20, that is, the distance between the axis 21 and the light-emitting center 12 is equal to the focal length "f" of the rod lens 20, the following relationship is satisfied:

$$\theta = \tan^{-1}\left(\left(\frac{W}{2}\right)/f\right)$$

It is worth mentioning that, the light-emitting angle of the light-emitting unit 10 (for example, a range of FWHM) needs to be less than or equal to 2θ, so that all the lights 11 outputted by the light-emitting unit 10 may enter the rod lens 20 and be applied to an entire light path, so as to avoid wasting part energy of the lights 11, and to improve the efficiency of the curing process, but there is no limited thereto.

It is worth mentioning that, the light 11 output by the light-emitting unit 10 of the present disclosure includes long-wave ultraviolet (also referred to as ultraviolet A or UVA). By changing a geometric curved surface of the packaging material covering the semiconductor die, so that the semiconductor die is just at the focal point of the geometric curved surface, the light shape and light angle outputted may be changed, and the light-emitting unit 10 may obtain the best light concentrating effect, and all the lights 11 may enter the rod lens 20, but there is no limited thereto.

In some embodiments, the light-emitting module 1 may further include a substrate 13 for carrying the light-emitting unit 10. The substrate 13 may include a metal core printed circuit board (MCPCB) or a copper bump substrate made of materials such as aluminum substrate, copper substrate, etc., or may also include a printed circuit board (PCB), for example, an FR-4 substrate, there is no limited thereto.

As shown in FIG. 2, in some embodiments, the number of the light-emitting units 10 is plural, and the light-emitting units 10 are arranged in parallel along the axial direction of the rod lens 20 (for example, along the axis 21) as a linear array light source 101, there is no limited thereto. The linear array light source 101 and the rod lens 20 may move along the X direction to scan a target object. The target object includes an object to be subjected to the curing process, such as at least one of epoxy resin, epoxy resin, acrylate, polyamide, polyimide, polyisoprene, agar, carrageenan, thorn bean at least one of gum, kangaroo gum or konjac, there is no limited thereto.

The rod lens 20 is adjacent to the light-emitting unit 10, and converges the light 11 along the optical axis 100.

In some embodiments, the rod lens 20 is a cylinder, the radial direction of the rod lens 20 is parallel to the optical axis 100, and the distance between an axis 21 of the rod lens 20 and the light-emitting center 12 of the light-emitting unit 10 along the radial direction is greater than or equal to the focal length "f" of the rod lens 20 along the radial direction. It is worth mentioning that, according to the principle of optics, when an object is within a focal length of a convex lens, the light will form an upright virtual image on the same side of the object, and the light may not be converged on the other side of the convex lens. Therefore, the distance between the axis 21 and the light-emitting center 12 must be greater than or equal to the focal length "f" of the rod lens 20, there is no limited thereto.

In some embodiments, the light-emitting module 1 further includes a lens holder 30, the lens holder 30 holds the rod lens 20 along the radial direction of the rod lens 20 perpendicular to the optical axis 100, and the distance between an axis 21 of the rod lens 20 and the light-emitting center 12 of the light-emitting unit 10 along the radial direction is equal to the focal length "f" of the rod lens 20 along the radial direction, there is no limited thereto.

As shown in FIG. 1, in some embodiments, the lens holder 30 includes two bracket units 31, the two bracket units 31 are arranged opposite to each other along the radial direction of the rod lens 20, and are symmetrically bent at a non-zero angle along the optical axis 100. Further, one side of the rod lens 20 that is close to the bracket unit 31 forms a supporting portion 32 with a larger volume (bulged shape), and the supporting portion 32 may exert greater frictional force and stabilization effect on the rod lens 20, but there is no limited thereto.

Therefore, when using the aforementioned light-emitting module 1, the rod lens 20 facing the light-emitting unit 10 may cover the entire light-emitting angle of the light-emitting unit 10 (for example, the "2θ"), so that all the lights 11 may enter the rod lens 20 and be applied to an entire light path, so as to avoid wasting part energy of the lights 11, and to improve an efficiency of the curing process. Compared with the related art, the light-emitting module 1 of the present disclosure does not need to increase the size of the rod lens 20, the distance between an axis 21 of the rod lens 20 and the light-emitting center 12 of the light-emitting unit 10 along the radial direction is greater than or equal to the focal length "f" of the rod lens 20 along the radial direction, and the light 11 is able to be concentrated on the other side of the rod lens 20, thereby, reducing a transmittance of the light 11 in the rod lens 20 is avoided.

Figure 3:
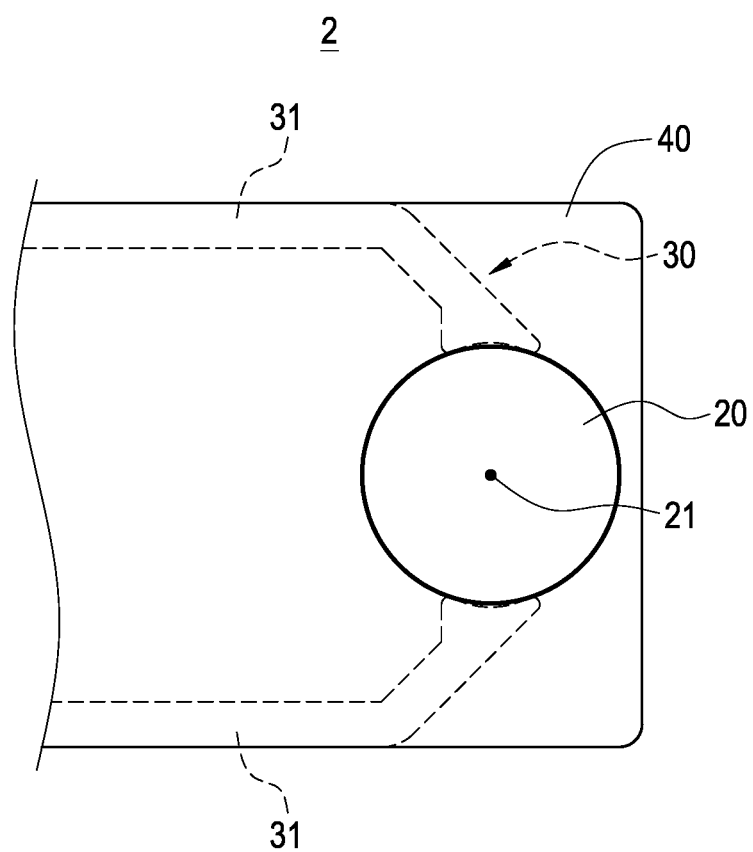
FIG. 3 is a schematic side view of a second embodiment of the light-emitting module of the present disclosure.
Figure 4A:
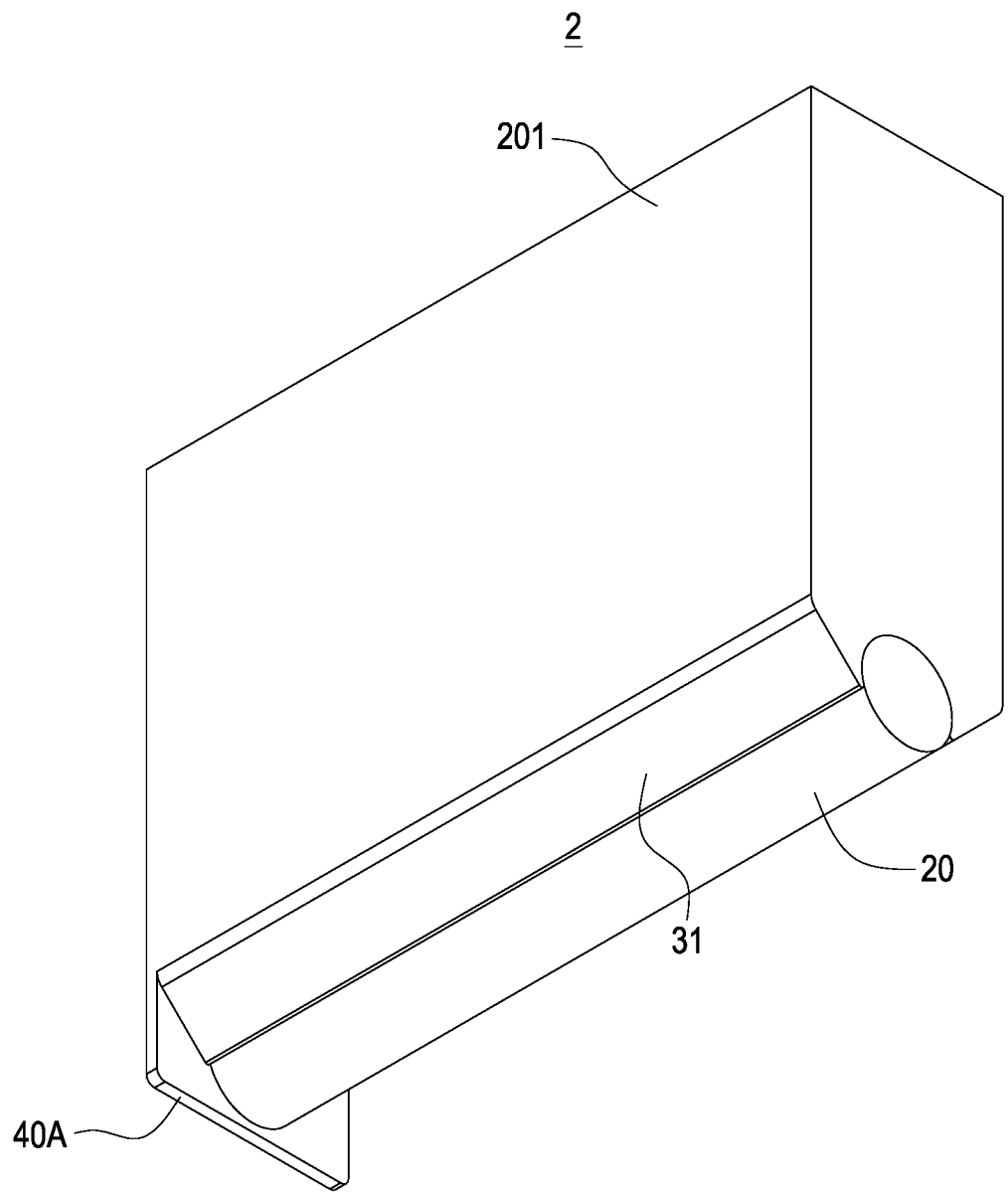
FIG. 4A and FIG. 4B are schematic views of an arrangement of the second embodiment of the light-emitting module of the present disclosure.
Figure 4B:
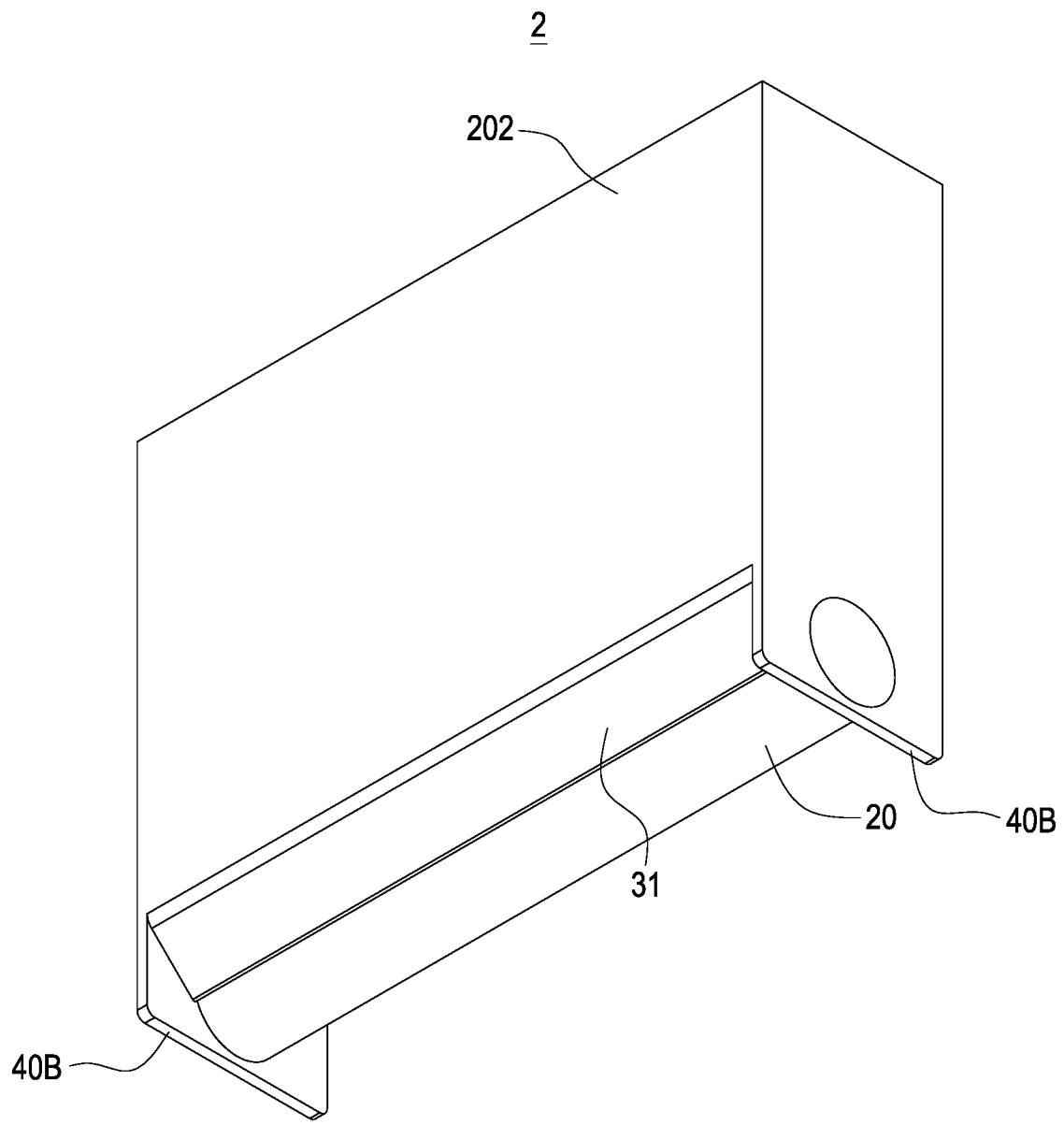

FIG. 3 is a schematic side view of a second embodiment of the light-emitting module of the present disclosure. FIG. 4A and FIG. 4B are schematic views of an arrangement of the second embodiment of the light-emitting module of the present disclosure.

As shown in FIG. 3 to FIG. 4B, a light-emitting module 2 of the present disclosure is substantially the same as the light-emitting module 1 of the first embodiment, and some differences between the light-emitting module 2 and the light-emitting module 1 are as follows:

The lens holder 30 includes a protection mechanism 40. The protection mechanism 40 is arranged on at least one side surface of the rod lens 20 along the axial direction, and protrudes out of the side surface along the optical axis 100.

In some embodiments, a portion of the protection mechanism protruding beyond the side surface is a plane. As shown in FIG. 3, the protection mechanism 40 and the lens holder 30 may be in one-piece form, or the protection mechanism 40 and the lens holder 30 may be independent parts, there is no limited thereto. As viewed from the outside in, the lens holder 30 is arranged inside one side of the protection mechanism 40, and only one axial plane of the rod lens 20 is visibly exposed, there is no limited thereto. Further, an implementation of the protection mechanism 40 may include a protection mechanism 40A and a protection mechanism which are described in detail as follows:

As shown in FIG. 4A, in some embodiments, the protection mechanism 40A and the bracket unit 31 extend along one of the radial directions of the rod lens 20 and may be integrally formed into a protection case 201. Alternatively, the protection mechanism 40A and the protection case 201 are independent parts, there is no limited thereto. The protection case 201 is used to further protect the light emitting units 10 (as shown in FIG. 1) arranged next to the rod lens 20, and the protection mechanism 40A may be selectively arranged on one side of the rod lens 20 along the axial direction, there is no limited thereto.

As shown in FIG. 4B in some embodiments, the protection mechanism 40B and the bracket unit 31 extend along one of the radial directions of the rod lens 20 and may be integrally formed into a protection case 202. Alternatively, the protection mechanism 40B and the protection case 202 are independent parts, there is no limited thereto. The protection case 202 is used to further protect the light emitting units 10 (as shown in FIG. 1) arranged next to the rod lens 20, and the protection mechanism 40B may be selectively arranged on two sides of the rod lens 20 along the axial direction, there is no limited thereto.

It is worth mentioning that, the protection mechanisms 40A, 40B protrude along each radial direction of the rod lens 20, there is no limited thereto. The protection mechanisms 40A and 40B are used to protect the rod lens 20 from directly touching the object to be cured when the rod lens 20 is used in the curing process. It not only ensures a reliability of the rod lens 20, but also improves a yield of the cured object.

Figure 5A:
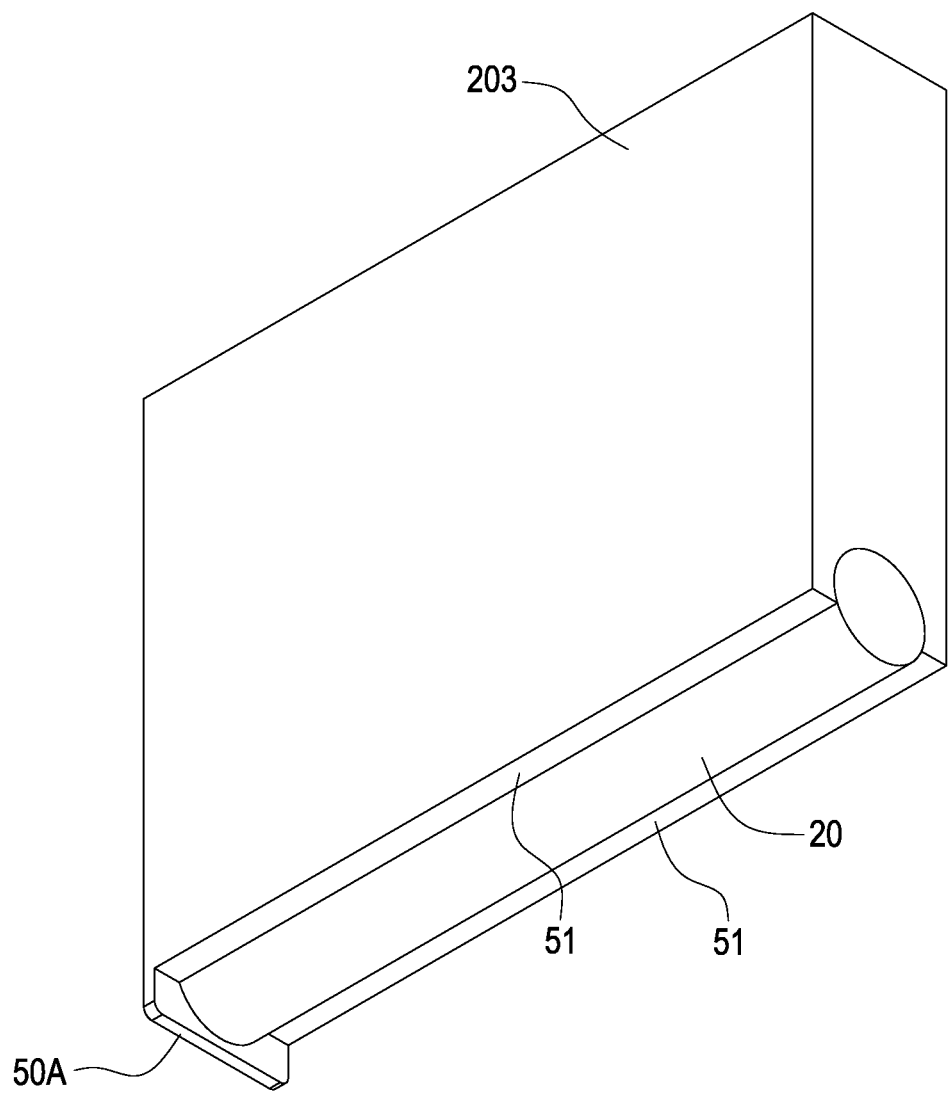
FIG. 5A and FIG. 5B are schematic views of an arrangement of a third embodiment of the light-emitting module of the present disclosure.
Figure 5B:
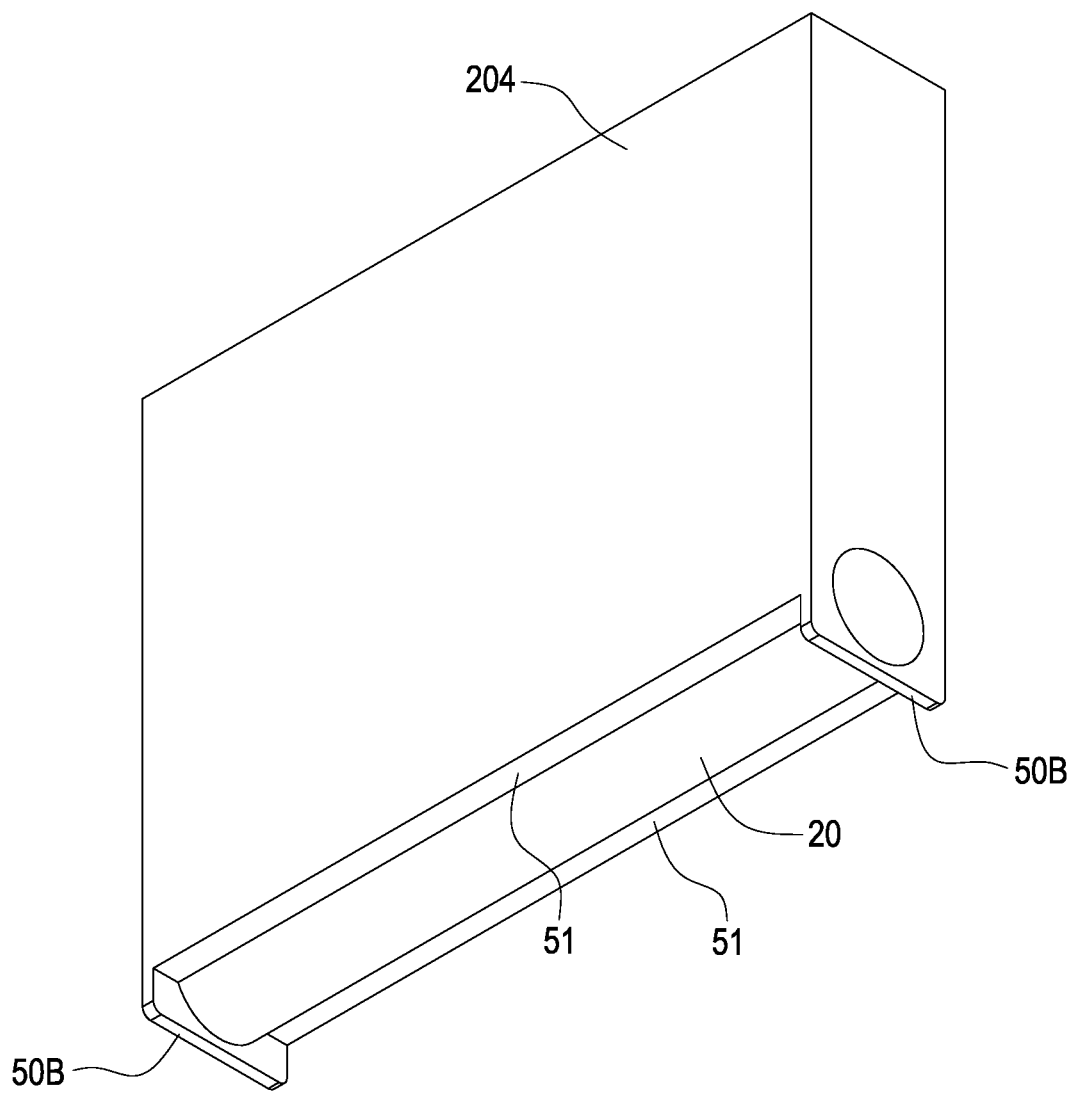

FIG. 5A and FIG. 5B are schematic views of an arrangement of a third embodiment of the light-emitting module of the present disclosure.

As shown in FIG. 5A to FIG. 5B, a light-emitting module 3 of the present disclosure is substantially the same as the light-emitting module 2 of the second embodiment, and some differences between the light-emitting module 3 and the light-emitting module 2 are as follows:

A protection mechanism 50 independently forms the protection case 201, and the bracket unit 31 of the lens holder 30 is not exposed outside the protection mechanism 50, there is no limited thereto. Further, an implementation of the protection mechanism 50 may include a protection mechanism 50A and a protection mechanism 50B, which are described in detail as follows:

As shown in FIG. 5A, in some embodiments, the protection mechanism 50A extends along one of the radial directions of the rod lens 20 and may be formed into a protection case 203. Alternatively, the protection mechanism 50A and the protection case 203 are independent parts, there is no limited thereto. The protective case 203 has two opposite sides 51 protruding along the radial direction of the rod lens 20. The two opposite sides 51 are used to cover and protect the light-emitting unit 10 (as shown in FIG. 1) and the rod lens 20, part of a cylindrical surface of the rod lens 20, and the lens holder 30 (as shown in FIG. 1), and the protection mechanism may be selectively arranged on one side of the rod lens 20 along the axial direction, there is no limited thereto.

As shown in FIG. 5B, in some embodiments, the protection mechanism 50B extends along one of the radial directions of the rod lens 20 and may be formed into a protection case 204. Alternatively, the protection mechanism 50A and the protection case 204 are independent parts, there is no limited thereto. The protective case 204 has two opposite sides 51 protruding along the radial direction of the rod lens 20. The two opposite sides 51 are used to cover and protect the light-emitting unit 10 (as shown in FIG. 1) and the rod lens 20, part of a cylindrical surface of the rod lens 20, and the lens holder 30 (as shown in FIG. 1), and the protection mechanism may be selectively arranged on two sides of the rod lens 20 along the axial direction, there is no limited thereto.

It is worth mentioning that, the protection mechanisms 50A, 50B protrude along each radial direction of the rod lens 20. The protection mechanisms 50A and 50B are used to protect the rod lens 20 from directly touching the object to be cured when the rod lens 20 is used in the curing process. It not only ensures a reliability of the rod lens 20, but also improves a yield of the cured object, there is no limited thereto.

In summary, the light-emitting module of the present disclosure is arranged in a manner that the radial direction of the rod lens is parallel to the optical axis. That is, the axis of the rod lens and the light-emitting center of the light-emitting unit are located on the same spatial plane, so that the light outputted by the light-emitting unit may be symmetrically refracted along the radial direction of the rod lens to have an ideal optical effect.

It is worth mentioning that, in some embodiments, the light-emitting angle of the light-emitting unit outputting the light is less than or equal to 2θ, the focal length of the rod lens along the radial direction is "f", and the diameter of the rod lens along the radial direction is "W", and the relationship is satisfied as follows:

$$\theta = \tan^{-1}\left(\left(\frac{W}{2}\right)/f\right).$$

According to the principle of optics, when an object is within a focal length of a convex lens, the light will form an upright virtual image on the same side of the object, and the light may not be converged on the other side of the convex lens. Compared with the related art, the light-emitting module of the present disclosure does not need to increase the size of the rod lens due to a design of the aforementioned relationship. The distance between an axis of the rod lens and a light-emitting center of the light-emitting unit along the radial direction is greater than or equal to a focal length of the rod lens along the radial direction, and the light is able to be concentrated on the other side of the rod lens, thereby, reducing a transmittance of the light in the rod lens is avoided.

In some embodiments, the light-emitting module further includes the protection mechanisms, and the protection mechanisms protrude along each radial direction of the rod lens. The protection mechanisms are used to protect the rod lens from directly touching the object to be cured when the rod lens is used in the curing process. It not only ensures a reliability of the rod lens, but also improves a yield of the cured object, there is no limited thereto.

Therefore, compared with the related art, the light-emitting module of the present disclosure does not need to increase the size of the rod lens to concentrate all lights outputted from the light-emitting unit. The object of improving the efficiency of the curing process and reducing the volume and cost of the curing system is achieved.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that may be easily conceived by those skilled in the art in the field of the present disclosure may be covered by the following claims.

What is claimed is:

1. A light-emitting module (1) comprising:
    a light-emitting unit (10) configured to output a light (11); and
    a rod lens (20) adjacent to the light-emitting unit (10), and configured to converge the light (11) along an optical axis (100);
    wherein a radial direction of the rod lens (20) is parallel to the optical axis (100), a distance between an axis (21) of the rod lens (20) and a light-emitting center (12) of the light-emitting unit (10) along the radial direction is greater than or equal to a focal length of the rod lens (20) along the radial direction;
    wherein a light-emitting angle of the light-emitting unit (10) outputting the light (11) is less than or equal to 2θ;
    wherein a following relationship is satisfied:

$$\theta = \tan^{-1}\left(\left(\frac{W}{2}\right)/f\right)$$

wherein f is the focal length of the rod lens (20) along the radial direction and W is a diameter of the rod lens (20) along the radial direction.

2. The light-emitting module (1) of claim 1, wherein the number of the light-emitting units (10) is plural, and the light-emitting units (10) are arranged in parallel along the axial direction of the rod lens (20) as a linear array light source (101).

3. The light-emitting module (1) of claim 1, further comprising:
a lens holder (30) configured to hold the rod lens (20) along the radial direction of the rod lens (20) perpendicular to the optical axis (100);
wherein the distance between the axis (21) of the rod lens (20) and the light-emitting center (12) of the light-emitting unit (10) along the radial direction is equal to the focal length of the rod lens (20) along the radial direction.

4. The light-emitting module (1) of claim 3, wherein the lens holder (30) comprises:

two bracket units (31) arranged opposite to each other along the radial direction of the rod lens (20), and symmetrically bent at a non-zero angle along the optical axis (100).

5. The light-emitting module (1) of claim 3, wherein the lens holder (30) comprises:
a protection mechanism (40, 40A, 40B) arranged on at least one side surface of the rod lens (20) along the axial direction, and protruding out of the side surface along the optical axis (100).

6. The light-emitting module (1) of claim 5, wherein a portion of the protection mechanism (40, 40A, 40B) protruding beyond the side surface is a plane.

7. The light-emitting module (1) of claim 1, further comprising:
a protection mechanism (50, 50A, 50B) arranged on at least one side surface of the rod lens (20) along the axial direction, and protruding out of the side surface along the optical axis (100).

8. The light-emitting module (1) of claim 7, wherein, a portion of the protection mechanism (50, 50A, 50B) protruding beyond the side surface is a plane.

* * * * *